(12) United States Patent
Olyunin et al.

(10) Patent No.: US 10,095,967 B2
(45) Date of Patent: Oct. 9, 2018

(54) APPARATUS AND METHOD FOR IMPLEMENTING MAGNETIC STRIPE TRANSMISSION CIRCUIT

(71) Applicant: Samsung Electronics Co., Ltd., Suwon-si, Gyeonggi-do (KR)

(72) Inventors: Nikolay Olyunin, Suwon-si (KR); Junsig Kum, Yongin-si (KR); Youngju Lee, Seoul (KR); Jung Yub Lee, Yongin-si (KR); Dohyuk Ha, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/438,168

(22) Filed: Feb. 21, 2017

(65) Prior Publication Data

US 2017/0249541 A1    Aug. 31, 2017

(30) Foreign Application Priority Data

Feb. 25, 2016  (KR) ........................ 10-2016-0022586

(51) Int. Cl.
*G06K 19/06* (2006.01)
*G06K 7/08* (2006.01)

(52) U.S. Cl.
CPC ....... *G06K 19/06206* (2013.01); *G06K 7/084* (2013.01); *G06K 19/06196* (2013.01)

(58) Field of Classification Search
CPC .......... G06K 19/06206; G06K 7/0084; G06K 19/06196
USPC ................. 235/493, 439, 440, 449
See application file for complete search history.

(56) References Cited

U.S. PATENT DOCUMENTS

| | | | |
|---|---|---|---|
| 8,514,591 B2* | 8/2013 | Lee .................. | H02M 3/33507 363/21.01 |
| 8,814,046 B1 | 8/2014 | Wallner | |
| 2016/0187523 A1* | 6/2016 | Sanmartin ............... | E21B 47/00 324/339 |

* cited by examiner

*Primary Examiner* — Karl D Frech
(74) *Attorney, Agent, or Firm* — Jefferson IP Law, LLP

(57) ABSTRACT

A magnetic stripe transmission (MST) apparatus that improves a recognition rate and operates at a low current is provided. The apparatus includes a first coil disposed between a first power supply source and a second power supply source, and wound in a first direction, a second coil connected in parallel to the first coil, disposed between the first power supply source and the second power supply source, and wound in a second direction, a first driver disposed between the first coil and the second power supply source, and configured to control a first current of the first coil according to a first voltage pulse supplied by a first pulse supply source, and a second driver disposed between the second coil and the second power supply source, and configured to control a second current of the second coil according to a second voltage pulse supplied by a second pulse supply source.

20 Claims, 12 Drawing Sheets

APPARATUS AND METHOD FOR IMPLEMENTING MAGNETIC STRIPE TRANSMISSION CIRCUIT

CROSS-REFERENCE TO RELATED APPLICATION(S)

This application claims the priority under 35 U.S.C. § 119(a) of a Korean patent application filed on Feb. 25, 2016 in the Korean Intellectual Property Office and assigned Serial No. 10-2016-0022586, the entire disclosure of which is hereby incorporated by reference.

TECHNICAL FIELD

The present disclosure relates to magnetic stripe data. More particularly, the present disclosure relates to implementing a magnetic stripe transmission (MST) circuit.

BACKGROUND

In order to transmit payment card data or information other than the payment card data to a point of sale (POS) terminal, an electronic device may include a magnetic stripe transmission (MST) circuit. The MST circuit may generate magnetic stripe data by controlling the magnitude of a current flowing through a coil. The electronic device including the MST circuit may generate magnetic stripe data including payment-related information (e.g., payment card information) and may transmit the generated magnetic stripe data to a POS terminal located at a recognizable distance from the electronic device.

Typically, the maximum allowable current of a battery included in the electronic device is proportional to the capacity of the battery. In order to be normally driven, an existing MST circuit needs to be supplied with a current having a predetermined level or higher from the battery. However, there occurs a technical problem such that the capacity of a battery becomes smaller as the size of a portable electronic device becomes smaller, and accordingly, a maximum allowable current supplied from the battery may become smaller. As a result, when the capacity of the battery is small, the existing MST circuit may have difficulty in normally operating.

A magnetic-field near-field is determined according to the magnitude of a current flowing through a coil, the size of the coil, the inductance thereof, and the like. However, in terms of costs or the miniaturization of the electronic device, a large restriction exists in changing the magnitude of the current flowing through the coil or changing the size of the coil to be large. Also, the existing MST circuit is problematic in that, when the inductance of the existing MST circuit increases, a rise time period of the current of the existing MST circuit simultaneously increases and thus, an information recognition rate in the POS terminal is reduced.

Accordingly, there is a need for a low-current MST driving circuit that can normally operate in an electronic device (e.g., a wearable electronic device) having a low battery capacity. Also, there is a need for the MST circuit for improving a recognition rate without changing the magnitude of the current of the coil and the size of the coil.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a magnetic stripe transmission (MST) circuit.

Another aspect of the present disclosure is to provide an MST circuit for generating a coil current having a particular waveform.

Another aspect of the present disclosure is to provide an MST circuit that operates at a low current.

Another aspect of the present disclosure is to provide an MST circuit for improving a recognition rate.

Another aspect of the present disclosure is to provide an MST circuit including two mutually-coupled coils.

Another aspect of the present disclosure is to provide an MST circuit including two coils that are not mutually coupled.

Another aspect of the present disclosure is to provide an MST circuit for reducing a ripple.

Another aspect of the present disclosure is to provide an MST circuit including a low-pass filter.

In accordance with an aspect of the present disclosure, an MST apparatus is provided. The MST apparatus includes a first coil disposed between a first power supply source and a second power supply source, and wound in a first direction, a second coil connected in parallel to the first coil, disposed between the first power supply source and the second power supply source, and wound in a second direction, a first driver disposed between the first coil and the second power supply source, and configured to control a first current of the first coil according to a first voltage pulse supplied by a first pulse supply source, and a second driver disposed between the second coil and the second power supply source, and configured to control a second current of the second coil according to a second voltage pulse supplied by a second pulse supply source.

In accordance with another aspect of the present disclosure, a method for operating a magnetic stripe transmission apparatus is provided. The method includes generating a first current corresponding to a first coil wound in a first direction at a first time period, and generating a second current corresponding to a second coil wound in a second direction at a second time period.

According to an embodiment of the present disclosure, an MST circuit, which is capable of improving a recognition rate and is capable of operating at a low current, can be implemented.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of the certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
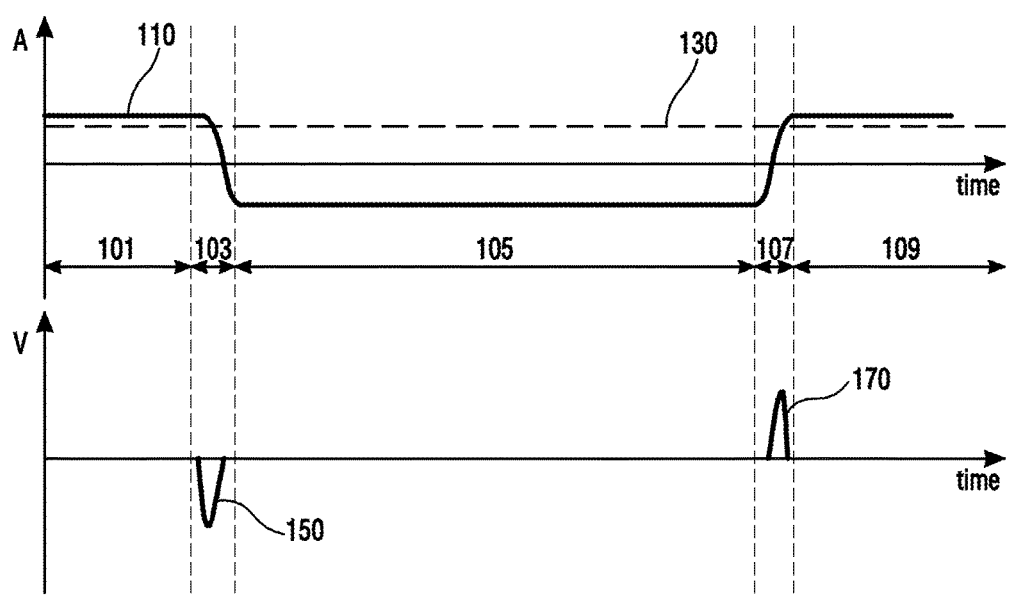
FIG. 1 is a diagram illustrating a waveform of a current flowing through a coil of a magnetic stripe transmission (MST) circuit and a waveform of a voltage measured by a point of sale (POS) terminal according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the present disclosure sets forth a magnetic stripe transmission (MST) circuit capable of being driven at a low current and a technique related to an improvement in a recognition rate of the MST circuit. The MST circuit according to an embodiment of the present disclosure may be referred to as an "MST apparatus."

The terms used in the following description are exemplified for convenience of description. Accordingly, various embodiments of the present disclosure are not limited to the terms set forth below, and another term having an equivalent technical meaning may be used.

The MST circuit includes one or more coils. The MST circuit may generate a magnetic field by controlling a current flowing through a coil. The MST circuit may be included in an electronic device. The electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group (MPEG-1 or MPEG-2) audio layer-3 (MP3) player, a mobile medical device, a camera, and a wearable device (e.g., a head-mounted device (HMD) such as electronic glasses, electronic clothes, an electronic bracelet, an electronic necklace, an electronic appcessory, an electronic tattoo, a smart watch, etc.). The electronic device may deliver pre-stored payment-related information to a head of a point of sale (POS) terminal by using a magnetic field generated by the MST circuit. That is, the electronic device may transmit magnetic stripe data, which includes payment-related information, to the POS terminal through an MST circuit.

An objective of the present disclosure is to provide a technique related to the MST circuit capable of being driven at a low current. Another objective of the present disclosure is to provide the MST circuit for improving a recognition rate without changing the magnitude of a current flowing through a coil and the size of the coil to be larger.

FIG. 1 is a diagram illustrating a waveform of a current flowing through a coil of an MST circuit and a waveform of a voltage measured by a head of a POS terminal according to the related art.

Figure 2:
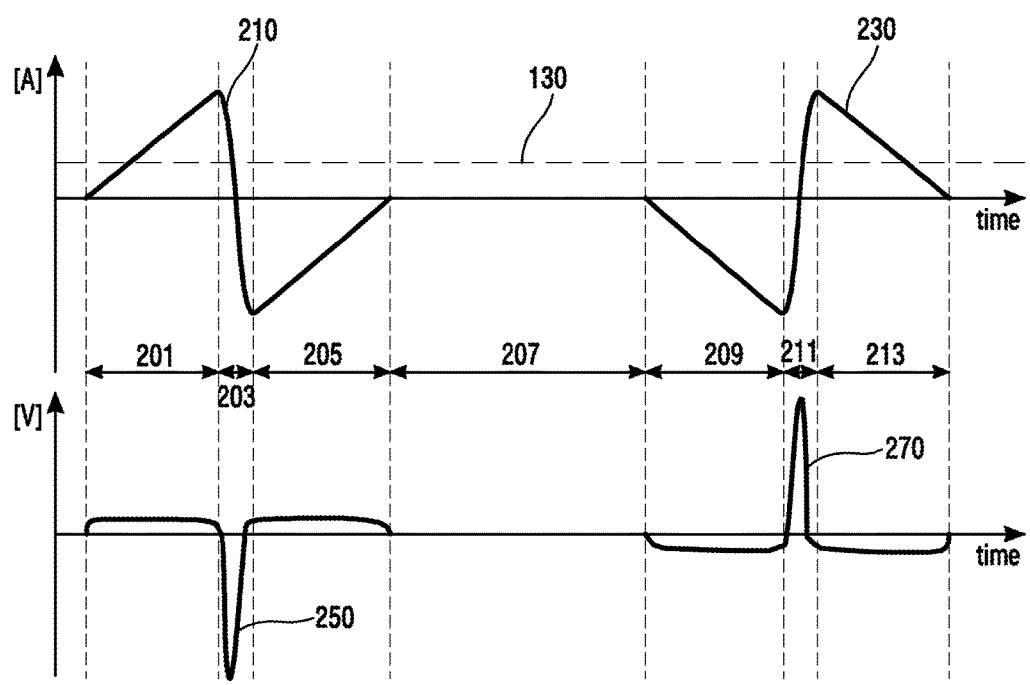
FIG. 2 is a diagram illustrating a waveform of a current flowing through a coil of an MST circuit and a waveform of a voltage measured by a POS terminal according to an embodiment of the present disclosure.

The waveform of the current of the coil and the waveform of the voltage, which are illustrated in FIG. 1 according to the related art, are presented merely for the purpose of being compared with waveforms of a current and a voltage which are illustrated in FIG. 2 according to an embodiment of the present disclosure. Accordingly, the presented waveforms of FIG. 1 should not be understood as limiting the present disclosure.

Referring to FIG. 1, the waveform 110 of the current flowing through the coil of the existing MST circuit may be divided into periods 101, 105, and 109, during each of which the magnitude of the current is constantly maintained, and a falling edge 103 and a rising edge 107 which are transition periods during each of which the magnitude of the current is changed. When the magnitude of the current flowing through the coil of the MST circuit is changed, the head of the POS terminal may detect a voltage on the basis of the change in the magnitude of the current. That is, magnetic stripe data may be transmitted during the transition periods 103 and 107 in each of which the magnitude of the current flowing through the coil of the MST circuit is changed. Specifically, a variation during a unit time period of the current flowing through the coil of the MST circuit may correspond to the voltage measured by the head of the POS terminal. That is, a change value (i.e., a value obtained by differentiating a current waveform with respect to time) of the magnitude of a current flowing through the coil during the transition period 103 may correspond to a voltage 150 measured by the head of the POS. Here, the reason why the voltage 150 has a negative value is because the magnitude of the current flowing through the coil during the transition period 103 is reduced. Also, a change value (i.e., a value obtained by differentiating a current waveform with respect to time) of the magnitude of a current flowing through the coil during the transition period 107 may correspond to a voltage 170 measured by the head of the POS. Here, the reason why the voltage 170 has a positive value is because the magnitude of the current flowing through the coil during the transition period 107 is increased. The POS terminal may acquire payment-related information on the basis of the measured voltages 150 and 170.

Here, it is necessary to pay attention to magnitudes of absolute values of the voltages 150 and 170 measured by the head of the POS terminal. This is because the POS terminal is capable of better recognizing (i.e., a recognition range is increased) the magnetic stripe data transmitted by the MST circuit as the absolute values of the voltages 150 and 170 become larger. The magnitudes of the absolute values of the voltages 150 and 170 are respectively proportional to a change in the magnitude of a current flowing through the coil during the transition period 103 and a change in the magnitude of a current flowing through the coil during the transition period 107. It can be noted that magnitudes of absolute values of currents during the periods 101, 105, and 109, during each of which the magnitude of the waveform 110 of the current flowing through the coil of the MST circuit of the related art is constantly maintained, is similar to the magnitude of an average current 130 supplied from a power source. Accordingly, the changes in the magnitudes of the currents flowing through the coil during the respective transition period 103 and 107 may not get out of a range which is about twice the value of the average current 130. For example, when the magnitude of the average current 130 supplied from the power source is 2 amps, a maximum variation of the magnitude of a current flowing through the coil during a transition period may not get out of a range of about 4 amps.

Because the size of the electronic device has gradually become smaller, the capacity of the battery included in the electronic device may become smaller due to a technical problem. The magnitude of a maximum current that the battery is capable of supplying is proportional to the capacity of the battery. Accordingly, when the capacity of the battery becomes smaller, the magnitude of the maximum current becomes smaller. In order to normally drive the existing MST circuit that generates the waveform 110 of the current illustrated in FIG. 1, the coil of the existing MST circuit needs to be supplied with a current having a predetermined level or higher from the battery. Accordingly, in the electronic device having a small battery capacity, the existing MST circuit may not normally operate. Accordingly, an MST circuit capable of operating at even a low current is required to reflect the trend for the miniaturization of the electronic device.

FIG. 2 is a diagram illustrating a waveform of a current flowing through a coil of an MST circuit and a waveform of a voltage measured by a POS terminal according to an embodiment of the present disclosure.

An objective of the present disclosure is to implement an MST circuit for generating a waveform of current as illustrated in FIG. 2 and for being driven in an electronic device having a relatively small battery capacity. Also, a recognizable range of magnetic stripe data that the MST circuit generates may become wider than in the case of an MST circuit according to the related art.

Referring to FIG. 2, the MST circuit according to an embodiment of the present disclosure may include two coils, that is, a first coil and a second coil. Referring to FIG. 2, a waveform 210 of a first current flowing through the first coil and a waveform 230 of a second current flowing through the second coil are sequentially generated with a predetermined time interval as a reference, and are symmetrical to each other. The reason why the waveform of the first current corresponding to the first coil is symmetrical to the waveform of the second current corresponding to the second coil is because a direction in which the first coil is wound around a corresponding core differs from a direction in which the second coil is wound around a corresponding core. Also, it can be noted that a current of the coil of the MST circuit according to an embodiment of the present disclosure is constantly 0 in remaining parts except for the first current waveform 210 and the second current waveform 230. That is, it can be noted that the current of the coil of the MST circuit does not include a direct current (DC) component. However, the present disclosure may include an embodiment in which a very small constant current, which is close to zero, flows through the coil of the MST circuit.

More specifically, the first current waveform 210 representing a current flowing through the first coil may include a first transition period 203, during which a change in the magnitude of a current is relatively large during a unit time period, and second transition periods 201 and 205 during each of which a change in the magnitude of a current is relatively small during a unit time period. The reason why the change in the magnitude of a current during a unit time period of the second transition period is designed to be small is for causing a voltage, which is measured by the head of the POS terminal, to be small. This is because a voltage measured during the second transition period may be regarded as noise. The first transition period 203 is located between the second transition periods 201 and 205. A voltage 250 corresponds to the waveform 210 of the first current flowing through the first coil of the MST circuit. The absolute value of the voltage 250 has a relatively large value in a part corresponding to the first transition period of the first waveform, and has a relatively small value, which is close to zero, in a part corresponding to the second transition period. This is because the voltage 250 represents a result of differentiating the first waveform 210 with respect to time. The magnetic stripe data may be transmitted during the first transition period in which a high voltage is measured by the head of the POS terminal.

Also, similar to the first current waveform, the second current waveform 230 representing the current flowing through the second coil may include one first transition period 211 and two second transition periods 209 and 213. The first transition period 211 is located between the second transition periods 209 and 213. A voltage 270 corresponds to the waveform 230 of the second current flowing through the second coil of the MST circuit. The voltage 270 has characteristics identical to those of the voltage 250. Also, the voltage 250 and the voltage 270 are symmetrical to each other as in the case where the first current waveform 210 is symmetrical to the second current waveform 230.

The following description will be made of a case where the current and the voltage illustrated in FIG. 2 according to an embodiment of the present disclosure are compared with the current and the voltage illustrated in FIG. 1 according to the related art.

The transition width of the magnitude of a current of the coil of the MST circuit according to an embodiment of the present disclosure is wider than the transition width of the magnitude of a current of the coil of the MST circuit according to the related art. This is because, differently from the related art, a current of the coil of the MST circuit according to an embodiment of the present disclosure does not include a DC component and is maintained to be zero (or a very small value close to zero) during remaining periods 207 except for a transition period. Referring to FIG. 2, it can be noted that maximum values of absolute values of the first current waveform 210 and the second current waveform 230 are larger than a maximum average current 130 that the power source of the electronic device supplies. Accordingly, the transition width of the magnitude of a current during a unit time period in each of the first transition periods 203 and 211 may be wider than in the case of the related art. A transition width during a unit time period of a current of the coil of the MST circuit is measured to be wider than in the case of the prior art, and accordingly, a maximum value of an absolute value of a voltage measured by the head of the POS terminal may also be measured to be larger than a maximum value of an absolute value of a voltage according to the related art. As a result, the MST circuit capable of generating the current waveform illustrated in FIG. 2 is advantageous in that the MST circuit can be driven in the electronic device including a battery having a relatively small capacity. Also, a voltage measured by the head of the POS terminal is larger than in the case of the related art, so that a recognition rate can be improved.

Figure 3A:
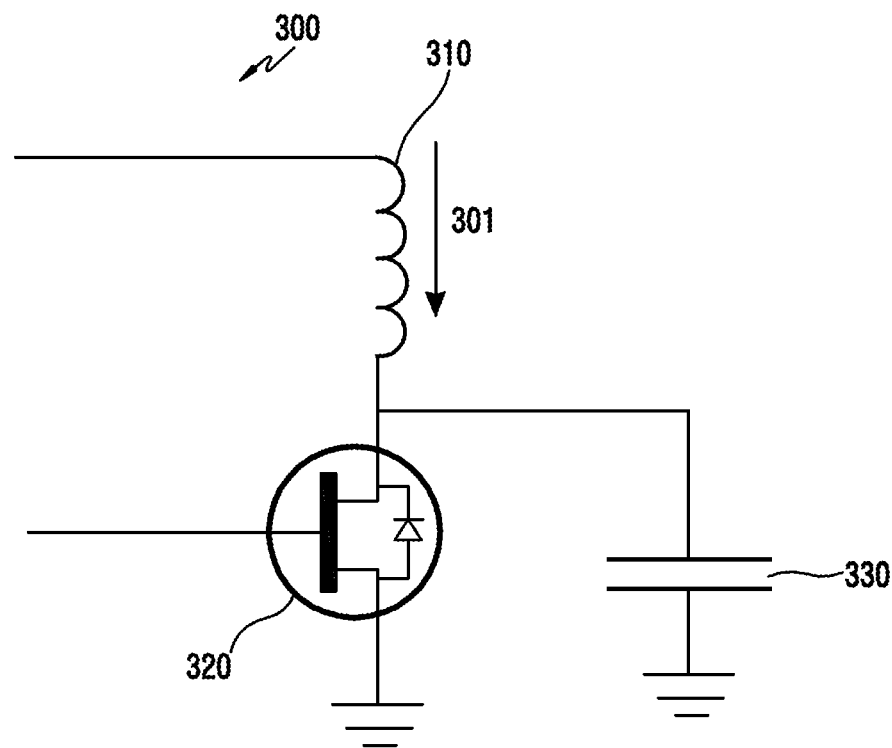
FIG. 3A is a circuit diagram illustrating a partial configuration of an MST circuit according to an embodiment of the present disclosure.

FIG. 3A is a circuit diagram illustrating a partial configuration of an MST circuit according to an embodiment of the present disclosure.

Referring to FIG. 3A, the circuit 300 includes a coil 310, a transistor 320, and a capacitor 330. The circuit 300 may be referred to as a "current waveform generator." Also, the coil and the transistor may be respectively referred to as an "inductor" and a "driver."

The coil 310 is a specific element implementing the inductance in the electronic device, and is configured such that a conductive wire is wound around a core. When a current flows through the coil 310, a magnetic flux is generated. Since the coil 310 has inductance, when the coil 310 is combined with the capacitor 330, the coil 310 may exhibit a resonance characteristic at a particular frequency. Particularly, the coil 310 may correspond to one of the above-described first coil and second coil according to a direction in which the conductive wire is wound around the core. That is, a direction 301 of a current flowing through the coil 310 may be changed according to a direction in which the coil 310 is wound around the core, and accordingly, the coil 310 may generate one of the first and second current waveforms illustrated in FIG. 2.

The transistor 320 is an active element having three or more terminals. The transistor 320 is characterized in that the transistor 320 is capable of controlling a voltage or current which is applied or flows between the other two terminals by controlling a voltage or current of a gate terminal. Particularly, according to an embodiment of the present disclosure, the circuit 300 may eventually control a current flowing through the coil 310 by controlling a gate voltage of the transistor 320.

The capacitor 330 is an element used to obtain the capacitance, and may exhibit a resonance characteristic at a particular frequency when the capacitor 330 is combined with the coil 310.

Although not illustrated in FIG. 3A, the circuit 300 is driven while the circuit 300 is supplied with a voltage (or a current) from a voltage source (or a current source). The voltage source may be disposed between the coil 310 and a ground connection. When a voltage is not supplied to the gate terminal of the transistor 320, a current does not flow through the coil 310. However, when a voltage having a predetermined magnitude or more is supplied to the gate terminal of the transistor 320, the magnitude of a current flowing through the inductor is increased while the voltage is supplied.

Figure 3B:
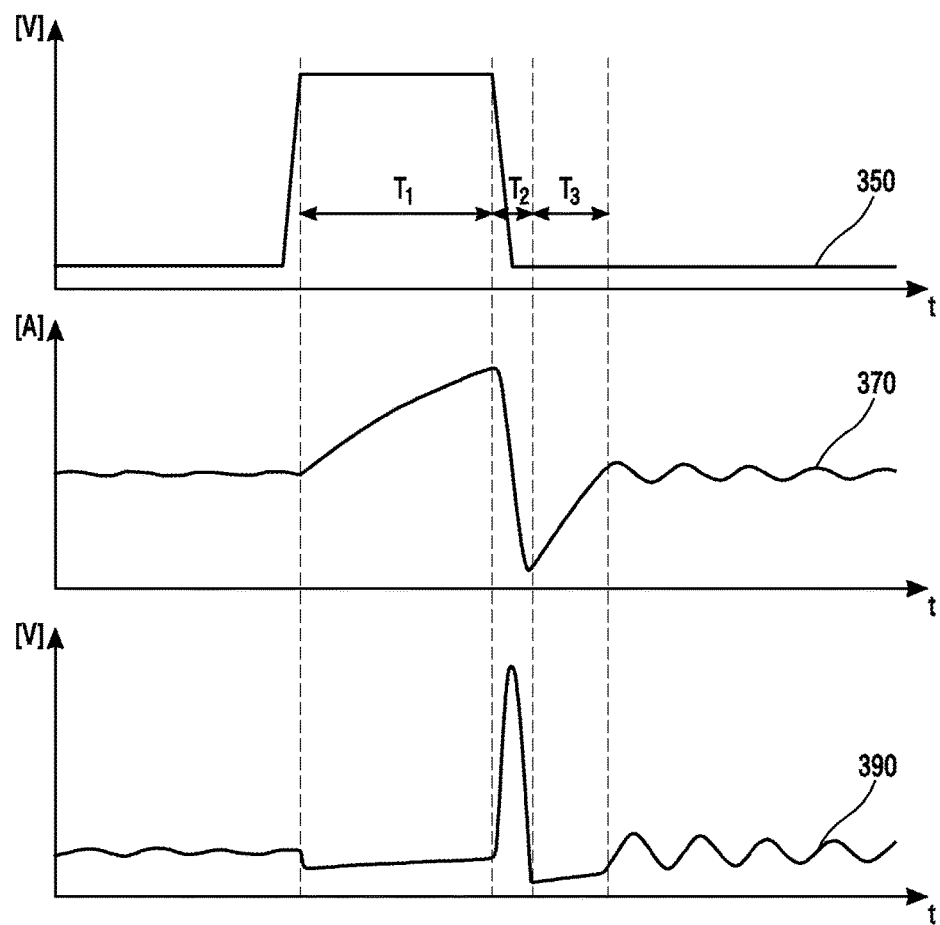
FIG. 3B is a diagram illustrating a current flowing through a coil and a voltage measured by a POS terminal when a pulse voltage is applied to a gate terminal of a transistor according to an embodiment of the present disclosure.

FIG. 3B is a diagram illustrating a current flowing through a coil and a voltage measured by a head of a POS terminal when a pulse voltage is applied to a gate terminal of a transistor according to an embodiment of the present disclosure.

Referring to FIG. 3B, consideration is given to a case where the pulse voltage 350 is applied to the gate terminal of the transistor 320 according to an embodiment of the present disclosure. It can be noted that, before the pulse voltage 350 is applied to the gate terminal of the transistor 320, a current 370 of the coil 310 and a voltage 390, which is measured by the POS terminal and corresponds to the current 370, both have a value of 0. However, when a pulse voltage having a predetermined magnitude is applied to the gate terminal of the transistor 320 during a period T1, the transistor 320 becomes an on-state, and the current 370 flowing through the coil 310 is gradually increased at a relatively slow speed. In this case, the head of the POS terminal may measure a voltage having a small magnitude, and the voltage measured during the period T1 may be regarded as noise.

When a voltage applied to the gate terminal of the transistor 320 again becomes zero after the period T1 passes, the transistor 320 does not operate and becomes an off-state. In this case, a current of the coil 310 is rapidly reduced during a period T2, and is then gradually increased during a period T3. As a result, after the elapse of the period T1 during which the pulse voltage is applied, a combination of the capacitor 330 and the coil 310 causes a current of the coil 310 to resonate at a particular resonance frequency. Here, the period T1 and the period T3 may correspond to the second transition period described with reference to FIG. 2. Also, the period T2 may correspond to the first transition period described with reference to FIG. 2. The greatest change in the waveform 370 of the current flowing through the coil 310 appears during the period T1, and accordingly, the waveform 390 of the voltage, which is measured by the head of the POS terminal, also has a maximum value. Magnetic stripe data is delivered to the head of the POS terminal during the period T1 (or the first transition period) in which the greatest change in the magnitude of the current flowing through the coil 310 appears.

Figure 4A:
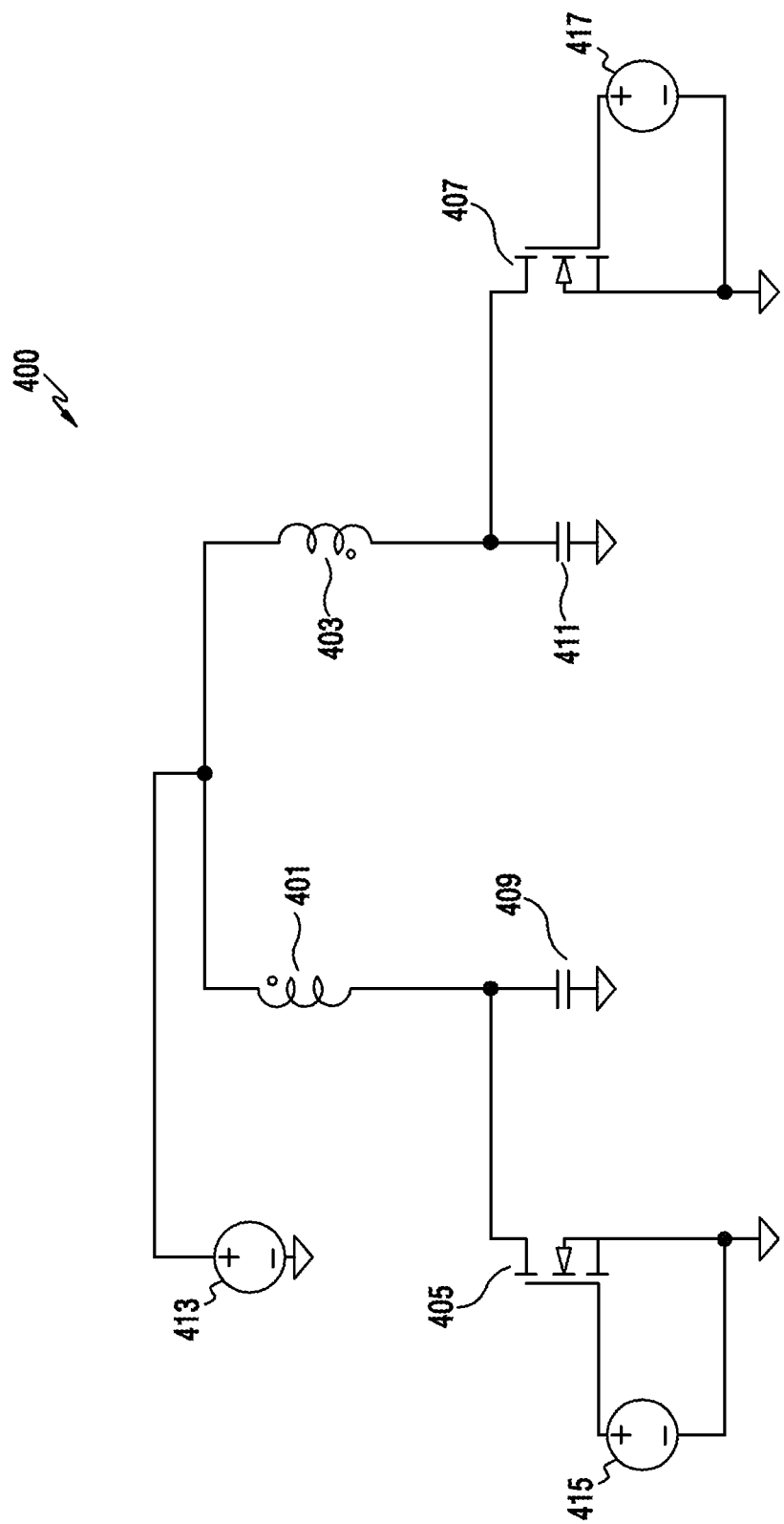
FIG. 4A is a circuit diagram illustrating an MST circuit including two coils, that are not mutually coupled, according to an embodiment of the present disclosure.

FIG. 4A is a circuit diagram illustrating an MST circuit including two coils, that are not mutually coupled according to an embodiment of the present disclosure.

Referring to FIG. 4A, the MST circuit 400 includes a first coil 401 and a second coil 403. The first coil 401 and the second coil 403 are formed around different cores. The first coil 401 and the second coil 403 differ from each other with respect to a direction in which a coil is wound around a core, and accordingly, differ from each other with respect to a direction of a current flowing through the coil. Also, the MST circuit 400 includes a first unipolar transistor 405 and a second unipolar transistor 407. The first and second unipolar transistors 405 and 407 may be referred to as "drivers." Also, the MST circuit 400 includes a first capacitor 409 and a second capacitor 411. The MST circuit 400 includes a voltage source (or a current source) 413 for driving the MST circuit 400. The MST circuit 400 includes a first pulse voltage source 415 for applying a pulse voltage to a gate terminal of the first unipolar transistor 405. The MST circuit 400 includes a second pulse voltage source 417 for applying a pulse voltage to a gate terminal of the second unipolar transistor 407. The first and second pulse voltage sources 415 and 417 may be referred to as "waveform generators." Here, the first and second coils 401 and 403 may both have an identical inductance value. Also, the first and second capacitors 409 and 411 may both have an identical capacitance value. Also, the first and second unipolar transistors 405 and 407 may both have identical characteristics. Further, respective pulse voltages generated by the first and second pulse voltage sources 415 and 417 may differ from each other with respect to a generation time point, and may be sequential.

The first and second coils 401 and 403 of the MST circuit 400 are formed to be wound around the separate cores, and does not exhibit a mutually coupled relationship. A current flowing through the first coil 401 may be controlled by the first unipolar transistor 405. That is, a pulse voltage having a predetermined magnitude or more is applied by the first pulse voltage source 415 connected to the gate terminal of the first unipolar transistor 405, and accordingly, a current may be generated from the first coil 401. Also, a current flowing through the second coil 403 may be controlled by the second unipolar transistor 407 and the second pulse voltage source 417 according to an identical scheme.

Figure 4B:
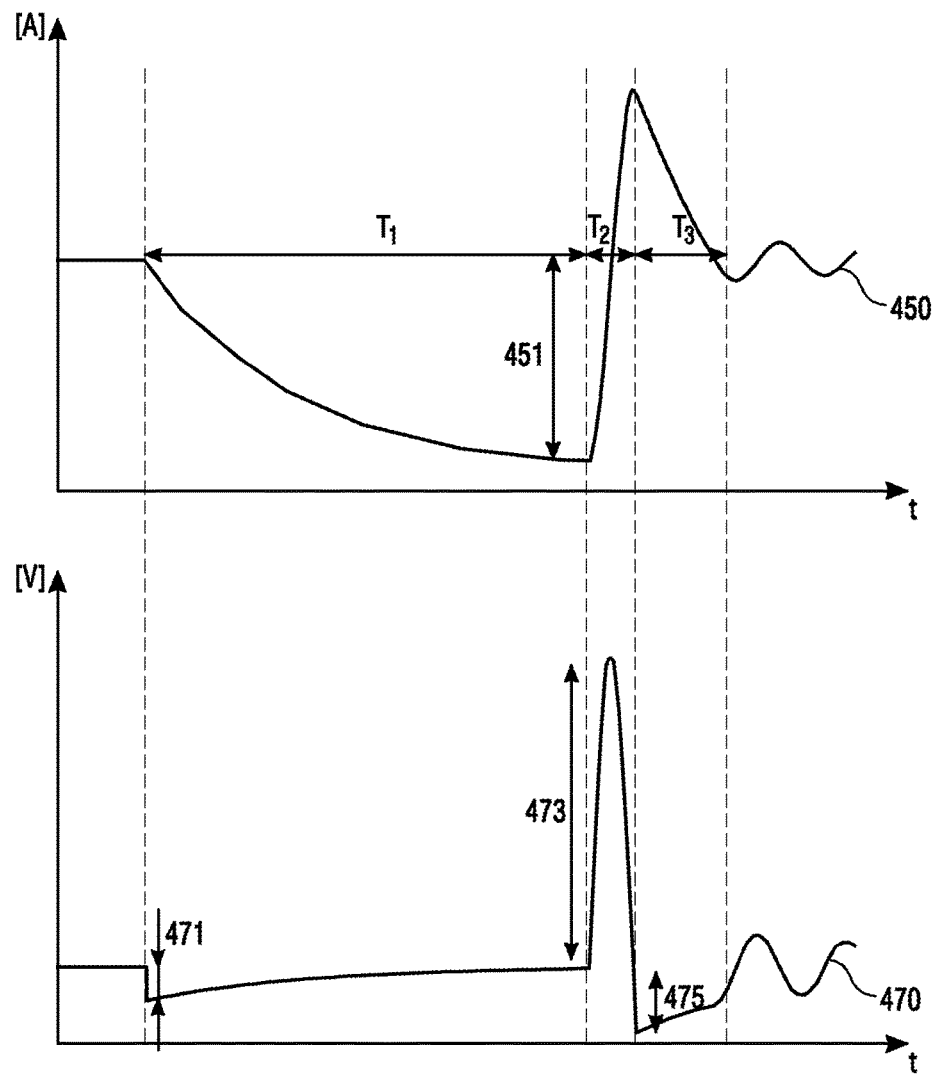
FIG. 4B is a diagram illustrating a waveform of a current flowing through a coil of an MST circuit and a waveform of a voltage measured by a POS terminal according to an embodiment of the present disclosure.

FIG. 4B is a diagram illustrating a waveform of a current flowing through a coil of an MST circuit and a waveform of a voltage measured by a POS terminal according to an embodiment of the present disclosure.

Referring to FIG. 4B, a waveform 450 of a current flowing through the first coil 401 and a voltage waveform 470 which has been measured by the head of the POS terminal and corresponds to the current waveform of the first coil 401 are illustrated. That is, the current waveform 450 is generated through on/off control over the first transistor 405. The voltage waveform 470 measured by the head of the POS terminal has a positive value.

Although not illustrated in FIG. 4B, a current waveform of the second coil 403 may have a waveform which is symmetrical to the current waveform 450 of the first coil 401 with a time axis (horizontal axis) as a reference. Also, a voltage waveform corresponding to the current waveform of the second coil 403 may have a waveform which is symmetrical to the voltage waveform 470 with the time axis (horizontal axis) as a reference. This is because the respective currents flowing through the first coil 401 and the second coil 403 only differ from each other with respect to a direction and are generated in the circuits both having an identical structure. The current waveform of the second coil 403 is generated through on/off control over the second unipolar transistor 407.

Specifically, the waveform 450 of the current flowing through the first coil 401 is maintained to be zero until a pulse voltage is applied by the first pulse voltage source 415. Thereafter, when the first pulse voltage source 415 applies a pulse voltage to the gate terminal of the first unipolar transistor 405 during a time period T1, an absolute value of the magnitude of a current flowing through the first coil 401 during the time period T1 is increased. According to an embodiment of the present disclosure, a maximum value 451 of an absolute value of the magnitude of a current flowing through the first coil 401 may be determined by Equation 1 below.

$$I_0 = \frac{V_0}{r}\left(1 - e^{-\frac{r}{L}T_{on}}\right) \qquad \text{Equation 1}$$

In Equation 1, $I_0$ represents the maximum value 451 of the absolute value of the magnitude of the current flowing through the first coil 401 during the time period T1. Also, r represents an internal resistance of the first coil 401, $V_0$ represents a DC voltage supplied by the voltage source 413, L represents an inductance of the first coil 401, and $T_{on}$ represents a time period, during which a pulse voltage is applied, and is identical to a time period during which the first transistor 405 is turned on. T1 may be referred to as a "second transition period" and is identical to $T_{on}$. According to an embodiment of the present disclosure, a maximum value 471 of a voltage measured by the head of the POS terminal during the period T1 may be determined by Equation 2 below.

$$kV_0\sqrt{L_{Rx}/L} \qquad \text{Equation 2}$$

In Equation 2, k represents a coupling coefficient between a transmission-side coil (the first coil 401) and a reception-side coil (i.e., a coil disposed in the head of the POS terminal), $L_{Rx}$ represents an inductance of the reception-side coil (the coil disposed in the head of the POS terminal), and L represents an inductance of the transmission-side coil (the first coil 401).

Also, the length of a first transition period T2, during which the greatest change in the magnitude of a current flowing through the first coil 401 during a unit time period appears, may be determined by Equation 3 below.

$$\pi\sqrt{LC} \qquad \text{Equation 3}$$

In Equation 3, L represents an inductance of the first coil 401, and C represents a capacitance of the first capacitor 409.

A maximum value 473 of an absolute value of a voltage measured by the head of the POS terminal during the first transition period T2 may be determined by Equation 4 below.

$$\approx kV_0\left(1 - e^{-\frac{r}{L}T_{on}}\right)\frac{\sqrt{L_{Rx}}}{r\sqrt{C}} \qquad \text{Equation 4}$$

In Equation 4, k represents the coupling coefficient between the transmission-side coil (the first coil 401) and the reception-side coil (i.e., the coil disposed in the head of the POS terminal), $V_0$ represents the DC voltage supplied by the voltage source 413, r represents the internal resistance of the first coil 401, L represents the inductance of the transmission-side coil (the first coil 401), $T_{on}$ represents a time period, during which a pulse voltage is applied and is a time period during which the first transistor 405 is turned on, C represents the capacitance of the first capacitor 409, and $L_{Rx}$ represents an inductance of the reception-side coil (the coil disposed in the head of the POS terminal).

From Equation 4, it can be noted that the magnitude of a voltage measured by the head of the POS terminal becomes larger as the value of a capacitance of a resonant capacitor (i.e., the first capacitor 409) becomes smaller. The first transition period T2 may be referred to as a "pulse width" from the perspective of a reception side (i.e., the head of the POS terminal).

Another second transition period T3 may be determined by Equation 5 below.

$$\approx \frac{L}{r}\left(\log\left(2 + \frac{V_j}{V_0} - e^{-\frac{rT_{on}}{L}}\right) - \log\left(1 + \frac{V_j}{V_0}\right)\right) + \frac{\pi}{2}\sqrt{LC} \quad \text{Equation 5}$$

In Equation 5, r represents the internal resistance of the first coil 401, L represents the inductance of the first coil 401, $V_0$ represents the DC voltage supplied by the voltage source 413, $T_{on}$ represents a time period, during which a pulse voltage is applied, and is a time period during which the first transistor 405 is turned on, C represents the capacitance of the first capacitor, and $V_j$ represents the value of a voltage drop of a junction of a parasitic diode of the first transistor. $V_j$ typically has a value of 0.2 to 0.8 V.

A maximum value 475 of a voltage measured by the head of the POS terminal during the second transition period T3 may be determined by Equation 6 below.

$$kV_0\sqrt{L_{Rx}/L}\left(2 + \frac{V_j}{V_0} - e^{-\frac{r}{L}T_{on}}\right) \quad \text{Equation 6}$$

In Equation 6, k represents the coupling coefficient between the transmission-side coil (the first coil 401) and the reception-side coil (i.e., the coil disposed in the head of the POS terminal), $V_0$ represents the DC voltage supplied by the voltage source 413, $L_{Rx}$ represents the inductance of the reception-side coil (the coil disposed in the head of the POS terminal), L represents the inductance of the first coil 401, $V_j$ represents the value of the voltage drop of the junction of the parasitic diode of the first transistor, r represents the internal resistance of the first coil 401, and $T_{on}$ represents a time period, during which a pulse voltage is applied, and is a time period during which the first transistor is turned on.

Values which are related to the waveform of the current flowing through the second coil 403 and the waveform of the voltage measured by the head of the POS terminal may be determined by applying Equations 1 to 6 as described above. However, the values of the variables used in Equations 1 to 6 may be changed. For example, the inductance of the first coil 401 may be changed to the inductance of the second coil 403, and the value of the capacitance of the first capacitor 409 may be changed to the value of the capacitance of the second capacitor 411. Also, the coupling coefficient k may be a coupling coefficient between the second coil and the reception-side coil (i.e., the coil disposed in the head of the POS terminal).

Figure 5A:
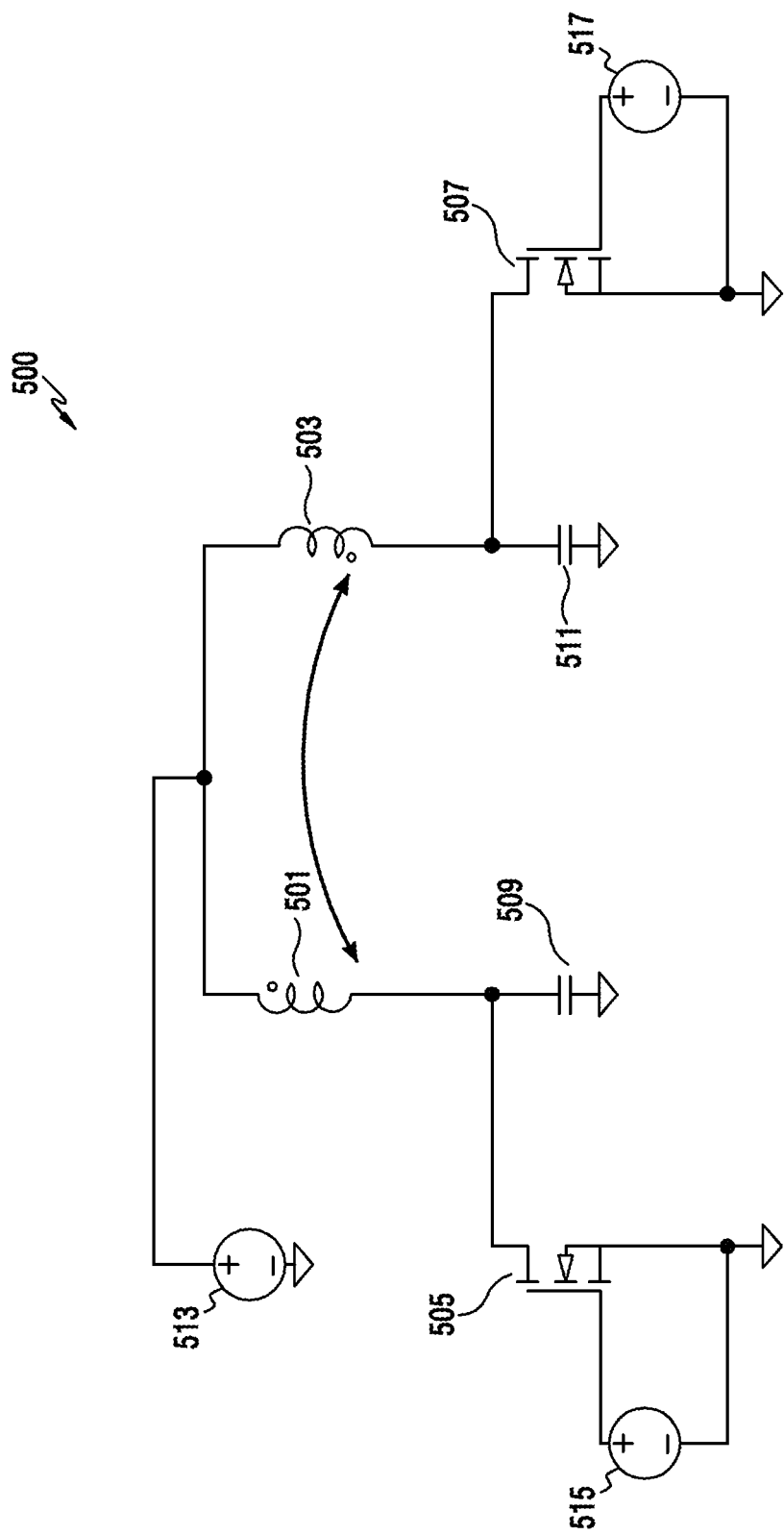
FIG. 5A is a circuit diagram illustrating an MST circuit including two mutually-coupled coils according to an embodiment of the present disclosure.

FIG. 5A is a circuit diagram illustrating an MST circuit including two mutually-coupled coils according to an embodiment of the present disclosure.

Referring to FIG. 5A, the MST circuit 500 includes a first coil 501 and a second coil 503. The first coil 501 and the second coil 503 differ from each other with respect to a direction in which a coil is wound around a core, and accordingly, differ from each other with respect to a direction of a current flowing through the coil. Also, the MST circuit 500 includes a first unipolar transistor 505 and a second unipolar transistor 507. The first and second unipolar transistors 505 and 507 may be referred to as "drivers." Also, the MST circuit 500 includes a first capacitor 509 and a second capacitor 511. The MST circuit 500 includes a voltage source (or a current source) 513 for driving the MST circuit 500. The MST circuit 500 includes a first pulse voltage source 515 for applying a pulse voltage to a gate terminal of the first unipolar transistor 505. The MST circuit 500 includes a second pulse voltage source 517 for applying a pulse voltage to a gate terminal of the second unipolar transistor 507. The first and second pulse voltage sources 515 and 517 may be referred to as "waveform generators." Here, the first and second coils 501 and 503 may both have an identical inductance value, and the first and second capacitors 509 and 511 may have an identical capacitance value. Also, the first and second unipolar transistors 505 and 507 may have identical characteristics. Further, respective pulse voltages generated by the first and second pulse voltage sources 515 and 517 may differ from each other with respect to a generation time point, and may be sequential.

The first and second coils 501 and 503 of the MST circuit 500 are formed to be wound around an identical core, and exhibit a mutually coupled relationship. That is, the first and second coils 501 and 503 are coupled with an optional coupling coefficient k, which is an integer included in a range of 0 to 1. Also, the coupling coefficient k differs from a coupling coefficient between a coil (a transmission side) of the MST circuit and a coil (a reception side) disposed in the head of the POS terminal. A current flowing through the first coil 501 may be controlled by the first unipolar transistor 505. That is, a pulse voltage having a predetermined magnitude or more may be applied by the first pulse voltage source 515 connected to the gate terminal of the first unipolar transistor 505, and accordingly, a current flowing through the first coil 501 may be generated. However, since the first and second coils 501 and 503 exhibit a mutually coupled relationship, although a pulse voltage is not applied to the gate terminal of the second unipolar transistor 507, a current may also flow through the second coil 503 according to a change in the current flowing through the first coil 501.

Also, the current flowing through the second coil 503 may be controlled by the second unipolar transistor 507 and the second pulse voltage source 517 according to an identical scheme. Similarly, in this case, since the first coil 501 is mutually coupled to the second coil 503, although a pulse voltage is not applied to the gate terminal of the first transistor, a current may flow through the first coil 501 according to a change in a current flowing through the second coil 503.

Figure 5B:
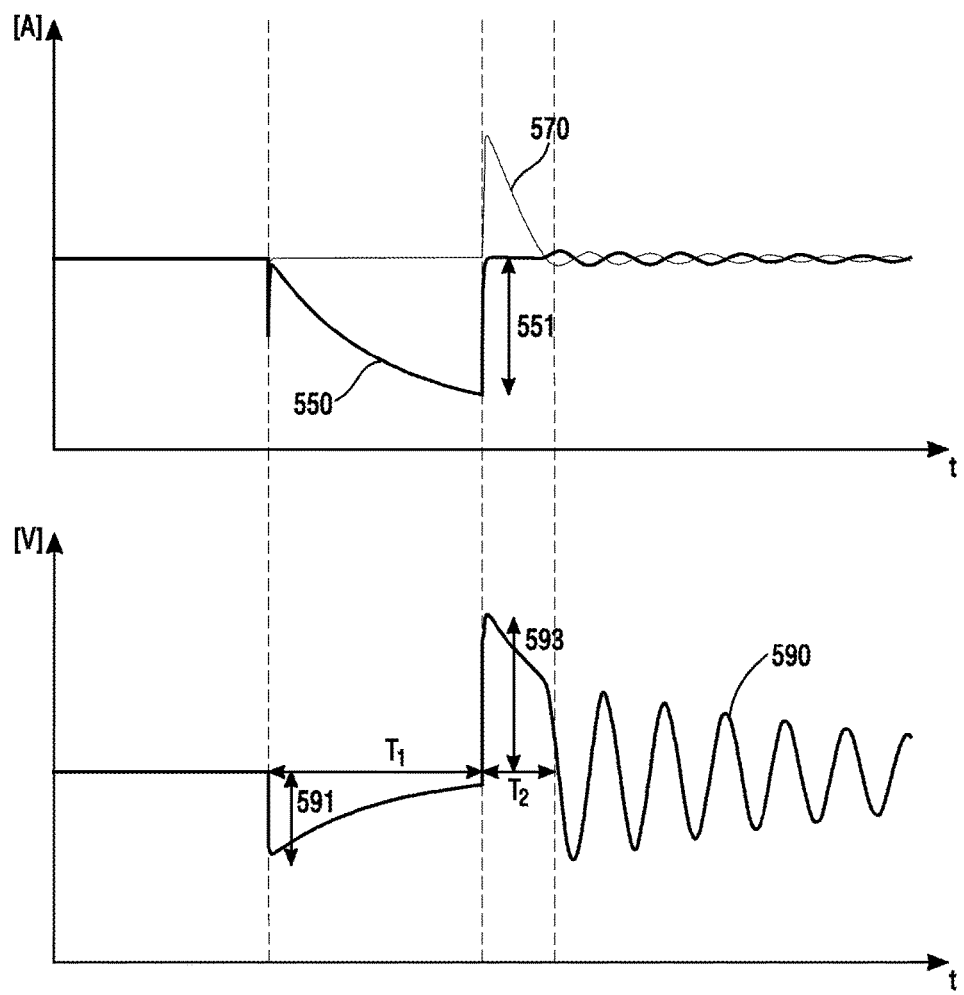
FIG. 5B is a diagram illustrating a waveform of a current flowing through a coil of an MST circuit and a waveform of a voltage measured by a head of a POS terminal according to an embodiment of the present disclosure.

FIG. 5B is a diagram illustrating a waveform of a current flowing through a coil of an MST circuit and a waveform of a voltage measured by a head of a POS terminal according to an embodiment of the present disclosure.

Referring to FIG. 5B, a waveform 550 of a current flowing through the first coil 501 and a waveform 570 of a current flowing through the second coil 503 are illustrated. Here, the waveform 570 of the current flowing through the second coil 503 is generated according to a mutually coupled relationship between the second coil 503 and the first coil 501 in a state where a voltage is not applied to the gate terminal of the second transistor 507. Also, FIG. 5B illustrates the waveform 590 of the voltage measured by the head of the POS terminal. That is, the current waveform 550 is generated through on/off control over the first transistor 505, and the current waveform 570 is generated according to the mutually coupled relationship between the coils. The waveform 590 of the voltage measured by the head of the POS terminal has a positive value.

Although not illustrated in FIG. 5B, the current waveform of the second coil 503 generated by applying a pulse voltage to the gate terminal of the second transistor 507 may have a waveform which is symmetrical to the current waveform 550 of the first coil 501 with a time axis (horizontal axis) as a reference. Also, the current waveform of the first coil 501 generated according to the coupled relationship between the first coil 501 and the second coil 503 may have a form of a waveform which is symmetrical to the current waveform 570 with the time axis (horizontal axis) as a reference. Further, in this case, the waveform of the voltage measured by the head of the POS terminal may have a waveform which is symmetrical to the voltage waveform 590 with the time axis (horizontal axis) as a reference. This is because the respective currents flowing through the first coil 501 and the second coil 503 only differ from each other with respect to a direction and are generated in the circuits both having an identical structure.

Specifically, the waveform 550 of the current flowing through the first coil 501 is maintained to be zero until a pulse voltage is applied by the first pulse voltage source 515. Thereafter, when the first pulse voltage source 515 applies a pulse voltage to the gate terminal of the first unipolar transistor 505 during a time period T1, an absolute value of the magnitude of a current flowing through the first coil 501 is gradually increased. According to an embodiment of the present disclosure, a maximum value 551 of an absolute value of the magnitude of a current flowing through the first coil 501 may be determined by Equation 7 below.

$$I_0 = \frac{V_0}{r}\left(1 - e^{-\frac{r}{L}T_{on}}\right) \quad \text{Equation 7}$$

In Equation 7, $I_0$ represents the maximum value 551 of the absolute value of the magnitude of the current flowing through the first coil 501. Also, r represents an internal resistance of the first coil 501, $V_0$ represents a DC voltage supplied by the voltage source 513, L represents an inductance of the first coil 501, and $T_{on}$ represents a time period, during which a pulse voltage is applied, and is a time period during which the first transistor 505 is turned on. T1 may be referred to as a "second transition period" and is identical to $T_{on}$. According to an embodiment of the present disclosure, a maximum value 591 of an absolute value of a voltage measured by the head of the POS terminal during the period T1 may be determined by Equation 8 below.

$$kV_0\sqrt{L_{Rx}/L} \quad \text{Equation 8}$$

In Equation 8, k represents a coupling coefficient between a transmission-side coil (the first coil 501) and a reception-side coil (i.e., a coil disposed in the head of the POS terminal), $L_{Rx}$ represents an inductance of the reception-side coil (the coil disposed in the head of the POS terminal), and L represents an inductance of the transmission-side coil (the first coil 501). Also, $V_0$ represents a DC voltage supplied by the voltage source 513.

Also, the length of a first transition period T2, during which the greatest change in the magnitude of a current flowing through the first coil 501 during a unit time period appears, may be determined by Equation 9 below.

$$\approx \frac{L}{r}\left(\log\left(2 + \frac{V_j}{V_0} - e^{-\frac{rT_{on}}{L}}\right) - \log\left(1 + \frac{V_j}{V_0}\right)\right) + \frac{\pi}{2}\sqrt{2LC} \quad \text{Equation 9}$$

In Equation 9, r represents the internal resistance of the first coil 501, L represents the inductance of the first coil 501, $V_0$ represents the DC voltage supplied by the voltage source 513, $T_{on}$ represents a time period, during which a pulse voltage is applied, and is a time period during which the first transistor 505 is turned on, C represents a capacitance of the first capacitor 509, $V_j$ and represents the value of a voltage drop of a junction of a parasitic diode of the first transistor 505. $V_j$ typically has a value of 0.2 to 0.8 V.

A maximum value 593 of an absolute value of a voltage measured by the head of the POS terminal during the first transition period T2 may be determined by Equation 10 below.

$$\approx kV_0\sqrt{\frac{L_{Rx}}{L}}\left(2 + \frac{V_j}{V_0} - e^{-\frac{r}{L}T_{on}}\right) \quad \text{Equation 10}$$

In Equation 10, k represents the coupling coefficient between the transmission-side coil (the first coil 501) and the reception-side coil (i.e., the coil disposed in the head of the POS terminal), $V_0$ represents the DC voltage supplied by the voltage source 513, r represents the internal resistance of the first coil 501, L represents the inductance of the transmission-side coil (the first coil 501), $T_{on}$ represents a time period, during which a pulse voltage is applied, and is a time period during which the first transistor 505 is turned on, $V_j$ represents the value of the voltage drop of the junction of the parasitic diode of the first transistor 505, and $L_{Rx}$ represents the inductance of the reception-side coil (the coil disposed in the head of the POS terminal).

The MST circuit 400 illustrated in FIG. 4A can improve a recognition rate by using a method for causing the magnitude of the voltage measured by the head of the POS terminal to become larger by reducing a capacitance value. The MST circuit 500 illustrated in FIG. 5A can improve a recognition rate by causing the width of the waveform of the voltage measured by the head of the POS terminal to become wider.

Figure 6A:
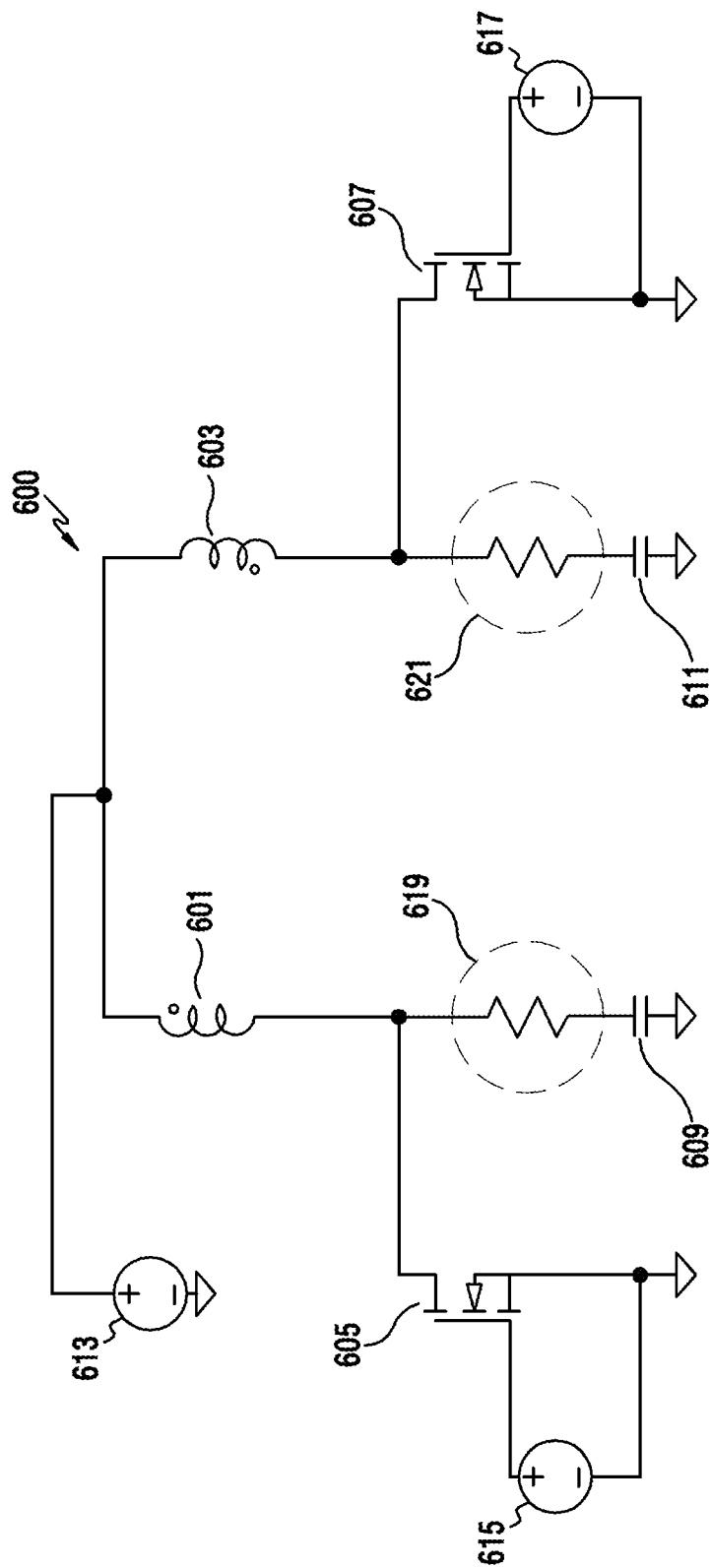
FIG. 6A is a circuit diagram illustrating an MST circuit for reducing a ripple according to an embodiment of the present disclosure.

FIG. 6A is a circuit diagram illustrating an MST circuit for reducing a ripple according to an embodiment of the present disclosure. When a resistor is added in series to a resonant capacitor, a ripple of a voltage measured by the head of the POS terminal may be reduced.

Referring to FIG. 6A, the MST circuit 600 is configured by adding a first resistor 619 and a second resistor 621 to the MST circuit 400 illustrated in FIG. 4A. That is, in the MST circuit 600, the first resistor 619 is connected in series to a first capacitor 609. Also, in the MST circuit 600, the second resistor 621 is connected in series to the second capacitor 611. The MST circuit 600 further includes a first coil 601, a second coil 603, a first unipolar transistor 605 and a second unipolar transistor 607. The MST circuit 600 also includes a voltage source (or a current source) 613 for driving the MST circuit 600, a first pulse voltage source 615 for applying a pulse voltage to a gate terminal of the first unipolar transistor 605, and a second pulse voltage source 617 for applying a pulse voltage to a gate terminal of the second unipolar transistor 607. Here, the first and second coils 601 and 603 may have an identical inductance value, and the first and second capacitors 609 and 611 may have an identical capacitance value. Also, the first and second unipolar transistors 605 and 607 may have identical characteristics. Further, respective pulse voltages generated by the first and second pulse voltage sources 615 and 617 may differ from each other with respect to a generation time point, and may be sequential.

Although FIG. 6A illustrates the MST circuit 600 as being configured by adding the first and second resistors 619 and 621 to the MST circuit 400 of FIG. 4A, according to another embodiment of the present disclosure, the MST circuit 600 may be configured by adding the first and second resistors 619 and 621 to the MST circuit 500 of FIG. 5A. That is, various embodiments of the MST circuit 600 illustrated in FIG. 6A may include not only an embodiment in which the first and second coils 601 and 603 are formed to be wound around separate cores and are not coupled, but also an embodiment in which the first and second coils 601 and 603 are formed to be wound around one core and are coupled with a coupling coefficient k.

Figure 6B:
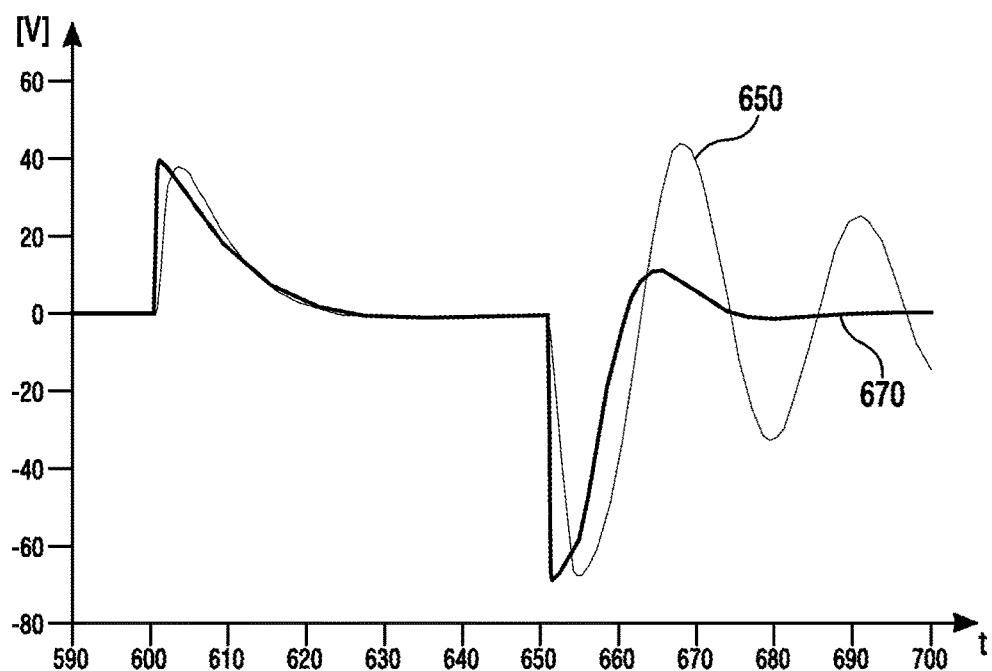
FIG. 6B is a waveform diagram illustrating a ripple reduction effect on a waveform of a voltage measured by a head of a POS terminal according to an embodiment of the present disclosure.

FIG. 6B is a waveform diagram illustrating a ripple reduction effect on a waveform of a voltage measured by a head of a POS terminal according to an embodiment of the present disclosure.

Referring to FIG. 6B, it can be noted that a ripple of the voltage waveform 670 in a case where the first and second resistors 619 and 621 are connected in series to the respective capacitors is significantly reduced as compared with the voltage waveform 650 in a case where the first and second resistors 619 and 621 are not connected in series to the respective capacitors.

Figure 7:
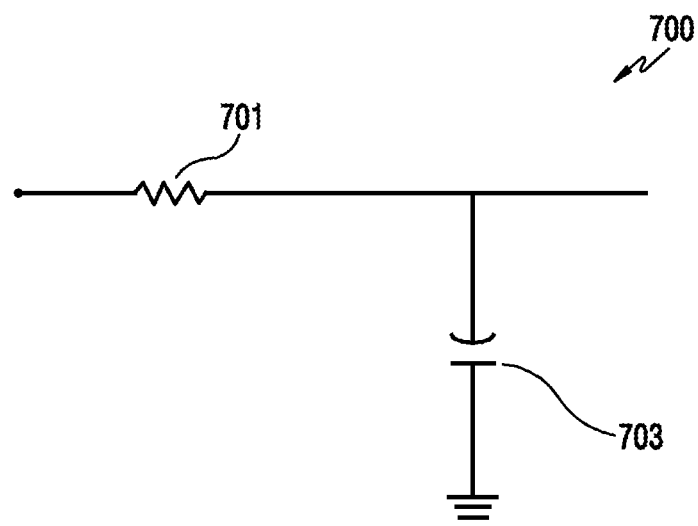
FIG. 7 is a circuit diagram illustrating a low-pass filter that may be added to an MST circuit according to an embodiment of the present disclosure.

FIG. 7 is a circuit diagram illustrating a low-pass filter that may be added to an MST circuit according to an embodiment of the present disclosure.

Referring to FIG. 7, a low-pass filter circuit 700 includes a resistor 701 and a capacitor 703. Although not illustrated in FIG. 7, the low-pass filter circuit 700 may be configured as a combination of a coil having a particular impedance value and the capacitor 703 instead of a combination of the resistor 701 and the capacitor 703. The low-pass filter circuit 700 may be additionally configured between the battery (the voltage resource 413) and the coils (the first and second coils 401 and 403) of the MST circuit 400. Alternatively, the low-pass filter circuit 700 may be additionally configured between the battery (the voltage resource 513) and the coils (the first and second coils 501 and 503) of the MST circuit 500.

A peak current measured at the battery becomes lower by adding the low-pass filter circuit 700 to the MST circuit 400 or 500. As a result, the battery of the electronic device can be protected. In addition, a waveform of a current flowing through the coil (the first or second coil) can be optimized by adding the low-pass filter circuit 700 to the MST circuit 400 or 500.

In terms of the miniaturization of a circuit and a recognition distance, the case where the low-pass filter circuit 700 includes the resistor 701 and the capacitor 703 may be more advantageous than the case where the low-pass filter circuit 700 includes the coil having the optional impedance value and the capacitor 703. In contrast, when the low-pass filter circuit 700 includes the coil and the capacitor 703, a peak current measured at the battery becomes lower, so that this configuration can be more advantageous in terms of the protection of the battery.

Figure 8:
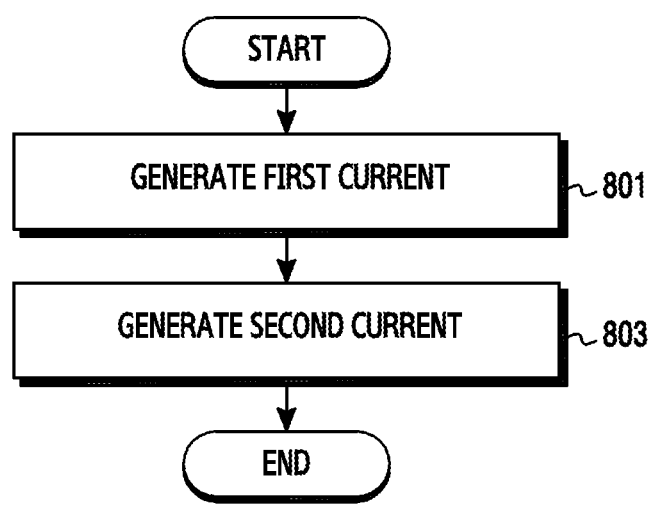
FIG. 8 is a flowchart illustrating current waveform generation operations for transmitting payment information according to an embodiment of the present disclosure.

FIG. 8 is a flowchart illustrating current waveform generation operations for transmitting payment information according to an embodiment of the present disclosure.

The respective operations illustrated in FIG. 8 may be performed by at least one of the MST circuit 400 illustrated in FIG. 4A and the MST circuit 500 illustrated in FIG. 5A. The flowchart illustrated in FIG. 8 represents the operations for operating the current waveforms illustrated in FIG. 2 according to an embodiment of the present disclosure.

Referring to FIG. 8, an MST circuit may generate a first current in operation 801. Specifically, the MST circuit may generate a first current flowing through a first coil. The MST circuit may generate a voltage pulse at a first time point and may control an operation of a transistor. That is, the MST circuit may generate a voltage pulse at the first time point and may turn on the transistor, and thereby may cause the first current to flow through the first coil.

In operation 803, the MST circuit may generate a second current. Specifically, the MST circuit may generate a second current flowing through a second coil. Here, respective directions in which the first current and the second current flow differ from each other since a winding direction of the first coil differs from that of the second coil. The MST circuit may generate a voltage pulse at a second time point and may control an operation of a transistor. That is, the MST circuit may generate a voltage pulse at the second time point and may turn on the transistor, and thereby may cause the second current to flow through the second coil.

Respective waveforms of the first and second currents which flow in the MST circuit may be identical to the waveforms of the currents illustrated in FIG. 2. Also, with respect to a waveform of a current generated by the MST circuit, the respective currents flowing through the first and second coils between the first time point and the second time point do not include DC components, or may correspond to very small values which are close to zero.

In the above-described embodiments of the present disclosure, the elements included in the present disclosure are expressed in a singular form or a plural form according to the proposed specific embodiment. However, the singular or plural expression is selected appropriately for a situation proposed for convenience of description, the present disclosure is not limited to a single element or multiple elements, and the elements expressed in a plural form may be configured as a single element or an element expressed in a singular form may be configured as multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for magnetic stripe transmission (MST), the apparatus comprising:
    a first coil disposed between a first power supply source and a second power supply source, and wound in a first direction;
    a second coil connected in parallel to the first coil, disposed between the first power supply source and the second power supply source, and wound in a second direction;
    a first driver disposed between the first coil and the second power supply source, and configured to control a first current of the first coil according to a first voltage pulse supplied by a first pulse supply source; and
    a second driver disposed between the second coil and the second power supply source, and configured to control a second current of the second coil according to a second voltage pulse supplied by a second pulse supply source.

2. The apparatus of claim 1,
    wherein the first pulse supply source is disposed between a gate terminal of the first driver and the second power supply source, and wherein the second pulse supply source is disposed between a gate terminal of the second driver and the second power supply source.

3. The apparatus of claim 1,
wherein the first power supply source supplies positive power, and
wherein the second power supply source corresponds to a ground.

4. The apparatus of claim 1, wherein the first coil and the second coil are wound around different cores.

5. The apparatus of claim 1, wherein the first coil and the second coil are wound around an identical core, and are coupled with k representing a coupling coefficient which is greater than or equal to 0 and is less than or equal to 1.

6. The apparatus of claim 1, wherein the first driver and the second driver correspond to unipolar drivers.

7. The apparatus of claim 1, further comprising:
a first capacitor; and
a second capacitor,
wherein the first capacitor is disposed between the first coil and the second power supply source, and
wherein the second capacitor is disposed between the second coil and the second power supply source.

8. The apparatus of claim 1, further comprising:
a first resistor; and
a second resistor,
wherein the first resistor is disposed between the first coil and the second power supply source, and
wherein the second resistor is disposed between the second coil and the second power supply source.

9. The apparatus of claim 1, further comprising a low-pass filter,
wherein the low-pass filter is disposed between the first power supply source and coils comprising the first coil and the second coil.

10. The apparatus of claim 9, wherein the low-pass filter comprises a third resistor and a third capacitor.

11. The apparatus of claim 9, wherein the low-pass filter comprises:
a third coil; and
a third capacitor.

12. The apparatus of claim 1,
wherein the first pulse supply source generates a first voltage pulse at a first time point,
wherein the second pulse supply source generates a second voltage pulse at a second time point, and
wherein a time interval exists between the first time point and the second time point.

13. The apparatus of claim 1, wherein a direction of the first current differs from a direction of the second current,
wherein the first current is generated at a time point corresponding to a first time point when the first voltage pulse is generated, and
wherein the second current is generated at a time point corresponding to a second time point when the second voltage pulse is generated.

14. The apparatus of claim 13, wherein a direct current component of a current flowing through each of the first coil and the second coil between the first time point and the second time point is substantially zero.

15. The apparatus of claim 1, wherein a maximum value of an absolute value of a magnitude of the first current and a maximum value of an absolute value of a magnitude of the second current are greater than an average magnitude of a current supplied by the first power supply source.

16. The apparatus of claim 1, wherein each of a waveform of the first current and a waveform of the second current includes a first transition period and a second transition period during each of which a magnitude of a current is changed,
wherein a change in a magnitude of a current during a unit time period in the first transition period is greater than a change in a magnitude of a current during a unit time period in the second transition period, and
wherein payment information is transmitted during at least one of the first transition period of the waveform of the first current and the first transition period of the waveform of the second current.

17. A method for operating a magnetic stripe transmission (MST) apparatus, the method comprising:
generating a first current corresponding to a first coil wound in a first direction at a first time period; and
generating a second current corresponding to a second coil wound in a second direction at a second time period,
wherein a direct current component of a current flowing through each of the first coil and the second coil between the first time point and the second time point is substantially zero.

18. The method of claim 17,
wherein each of a waveform of the first current and a waveform of the second current includes a first transition period and a second transition period during each of which a magnitude of a current is changed,
wherein a change in a magnitude of a current during a unit time period in the first transition period is greater than a change in a magnitude of a current during a unit time period in the second transition period, and
wherein payment information is transmitted during at least one of the first transition period of the waveform of the first current and the first transition period of the waveform of the second current.

19. The method of claim 17, wherein the first coil and the second coil are wound around different cores.

20. The method of claim 17, wherein the first coil and the second coil are wound around an identical core, and are coupled with k representing a coupling coefficient which is greater than or equal to 0 and is less than or equal to 1.

* * * * *